United States Patent [19]
Post

[11] Patent Number: 6,044,493
[45] Date of Patent: Apr. 4, 2000

[54] STRETCHABLE PROTECTIVE GARMENTS AND METHOD FOR MAKING SAME

[75] Inventor: David G. Post, Tampa, Fla.

[73] Assignee: Rubotech, Inc., Oldsmar, Fla.

[21] Appl. No.: 08/919,084

[22] Filed: Aug. 27, 1997

[51] Int. Cl.⁷ .................................................. A41D 19/00
[52] U.S. Cl. ...................................... 2/167; 2/16; 2/161.6
[58] Field of Search ............................. 2/159, 20, 161.6, 2/167, 169, 16

[56] References Cited

U.S. PATENT DOCUMENTS

| | | |
|---|---|---|
| 3,916,448 | 11/1975 | Hamel . |
| 4,156,753 | 5/1979 | Tanaka . |
| 4,445,232 | 5/1984 | Nelson . |
| 4,526,828 | 7/1985 | Fogt et al. . |
| 4,536,890 | 8/1985 | Barnett et al. . |
| 4,894,866 | 1/1990 | Walker . |
| 4,912,781 | 4/1990 | Robins et al. . |
| 4,984,301 | 1/1991 | Jordan, Jr. . |
| 5,059,477 | 10/1991 | Henrikson . |
| 5,087,499 | 2/1992 | Sullivan . |
| 5,113,532 | 5/1992 | Sutton . |
| 5,119,512 | 6/1992 | Dunbar et al. . |
| 5,231,700 | 8/1993 | Cutshall . |
| 5,442,815 | 8/1995 | Cordova et al. . |
| 5,568,657 | 10/1996 | Cordova et al. . |

*Primary Examiner*—Diana Oleksa
*Assistant Examiner*—Katherine Moran
*Attorney, Agent, or Firm*—Thomas, Kayden, Horstemeyer & Risley, LLP

[57] ABSTRACT

Stretchable protective garment material particularly useful in the fabrication of protective gloves for protecting the wearer against cuts, punctures, abrasions and the like. In a preferred aspect of the invention, the material is composed of a stretchable knitted blend of KEVLAR® and spandex fibers. The KEVLAR® fibers provide protection to the wearer against lacerations while the spandex fibers provides the material with elasticity such that the material is form-fitting. In one aspect of the invention, the palm surfaces of glove constructed of the material are provided with an elastomeric coating, preferably a textile printing polyvinyl chloride plastisol coating, which is bonded thereto through a novel curing process. This coating provides the wearer with additional protection against injury from sharp objects, a non-slip grip, and a high level of tactile sensitivity.

23 Claims, 3 Drawing Sheets

STRETCHABLE PROTECTIVE GARMENTS AND METHOD FOR MAKING SAME

FIELD OF THE INVENTION

This invention relates generally to protective material, and garments made from this material. More particularly, the invention relates to a stretchable protective glove that is resistant to cuts, punctures, abrasions, and the like, and which is also substantially elastic so that the wearer's manual dexterity and tactile sensitivity are not substantially hindered. The invention further relates to a method of producing this stretchable protective glove.

BACKGROUND OF THE INVENTION

Various cut and/or puncture resistant materials have been developed for use in the manufacture of protective garments to be worn by persons engaged in cutting operations or law enforcement operations. Exemplary materials include aramid fiber materials disclosed in U.S. Pat. No. 5,231,700, issued to Cutshall, and U.S. Pat. No. 4,526,828, issued to Fogt et al.; high performance polyethylene fiber materials disclosed in U.S. Pat. No. 5,442,815, issued to Cordova et al.; steel fiber materials disclosed in U.S. Pat. No. 4,912,781, issued to Robins et al.; and glass fiber materials disclosed in U.S. Pat. No. 5,119,512, issued to Dunbar et al.

While each of the above noted materials provide adequate protection to the wearer when handling sharp objects, these materials tend to reduce the freedom of movement of the wearer and dull the wearer's sense of touch, especially when the materials are used to form protective gloves. In several professions in which persons handle sharp objects, manual dexterity and tactile sensitivity are critical in performing the tasks of the profession. An example of one such profession is law enforcement. Law enforcement officials such as policemen, prison officers, and the like, frequently are called upon to interact with persons who might be carrying concealed sharp objects such as knives, needles, etc. Often, these officials must conduct searches of these persons which can entail reaching blindly into pockets, containers, or other such compartments in search of contraband or other evidence. In addition to searches, such officials must, from time to time, defend themselves from attacks with such sharp objects.

In that cuts, needle punctures, and other lacerations can cause serious injury or the contraction of life-threatening diseases, the official should be provided with adequate protection when entering such situations. At the same time, the official must not compromise freedom of movement or tactile sensitivity in achieving this protection since doing so could reduce the effectiveness with which the official conducts his or her duties, or even increase the risk of bodily harm to the official.

Similar to law enforcement officials, military personnel also may come in contact with sharp objects. As with law enforcement officials, these personnel must maintain manual dexterity and tactile sensitivity. For instance, soldiers may need to travel through thick brush or even engage in hand-to-hand combat, but also may need to operate ballistic weapons or electronic devices with a high level of precision.

Accordingly, it can be appreciated that there is a need for a protective garment material that allows the wearer a high level of cut and puncture protection but which does not substantially interfere with the wearer's mobility and sense of touch. Moreover, there is a need for a method of producing this material which permits for rapid manufacture so that high volume requests for garments constructed of the material can be quickly satisfied.

SUMMARY OF THE INVENTION

The present invention provides a stretchable, formfitting protective garment material that protects the wearer against cuts, punctures, and abrasions, and which substantially conforms to the contours of the wearer's body such that the manual dexterity and tactile sensitivity of the wearer are not significantly inhibited. Furthermore, the present invention relates to a method for the production of such garment material which results in effective manufacture in a minimum amount of time.

The garment material of the present invention comprises a plurality of cut resistant strands and elastic strands that typically are knitted together in a manner conventional in the art. Each of the cut resistant strands comprises a plurality of high strength cut resistant fibers while each of the elastic strands comprises a plurality of elastic fibers. To achieve the level of protection desired, the garment material is typically composed of approximately between 65% and 80% by composition of high strength cut resistant fibers. To achieve the desired amount of elasticity, the garment material is typically composed of approximately between 3% and 35% by composition of elastic fibers.

The high strength cut resistant fibers are preferably composed para-aramid fibers such as KEVLAR® fibers. Typically, two yarns of approximately 20 denier are used to form these strands. The elastic fibers preferably are spandex fibers such as LYCRA® fibers. Each elastic strand typically is composed of one multifilament spandex blend yarn of approximately 664 denier, although it will be appreciated that more than one yarn may be used if desired.

In one aspect of the invention, the garment material is used to manufacture protective gloves. The protective gloves generally approximate the contours of a human hand and include a glove body, a plurality of finger stalls, a thumb stall, and a palm surface. Preferably, the entire glove is integrally knitted so that the glove body, thumb stall, and finger stalls are all integrally formed with one another in a seamless construction. Further included is an elastic wrist cuff. Typically the cuff incorporates a plurality of elastic bands which ensure a snug fit about the wrist of the wearer.

The palm surface of the glove body and the palm-side surfaces of the finger and thumb stalls are provided with a palm coating. This coating preferably is composed of an elastomeric material such as high grade textile printing polyvinyl chloride plastisol. In use, the coating serves to provide additional protection from cuts, punctures, and abrasions by increasing the thickness of the palm surface of the glove, by providing a non-slip grip with which the wearer can securely grasp a blade of an assailant to prevent the assailant from completing the slashing action with the blade, and by providing a smooth surface along which sharp edges may quickly glide across to reduce the likelihood of the edge cutting the glove material.

In manufacturing the stretchable protective gloves, the elastomeric palm coating is applied in a specified pattern to the glove. In one aspect of the invention, a screen printing machine is used to effect this application. Curing of the coating is accomplished through a two-step heating process. First, the gloves are transported to a radiant heater capable of flashing the coated gloves with an intense burst of heat. Each of the coated gloves is exposed to temperatures approximately between 900° F. and 1200° F. for a total duration of approximately 6 to 15 seconds with this heater. Typically, the actual heating time is accomplished in 1–4 second intervals under separate emitter strips contained within the radiant heater. After leaving the radiant heater, the gloves are transferred to a standard convection oven and are subjected to temperatures approximately between 700° F. and 850° F. for a duration of approximately 60 to 120 seconds, thereby completing the curing process.

In use, the gloves of the present invention can be used by law enforcement officials as well as by military personnel to prevent injury from cuts, punctures, and abrasions to the hands. Equally important, the gloves provide this protection without a concurrent loss of freedom of movement, manual dexterity, tactile sensitive, or comfort.

Thus, it is an object of this invention to provide a protective glove which protects wearer's hands against cuts, punctures, and abrasions.

Another object of this invention is to provide a protective glove which is stretchable such that the glove can conform to the contours of the wearer's hands.

A further object of this invention is to provide a protective glove having an elastomeric palm coating which provides additional protection from cuts and the like, and which also provides for a non-slip grip.

Yet another object of this invention is to provide a method for rapidly producing the aforementioned protective gloves.

Another object of this invention is to provide a method for applying and curing an elastomeric or polymeric coating on textile material.

Other objects, features and advantages of this invention will become apparent upon reading the following specification, when taken in conjunction with the accompanying drawings.

DETAILED DESCRIPTION

Figure 1:
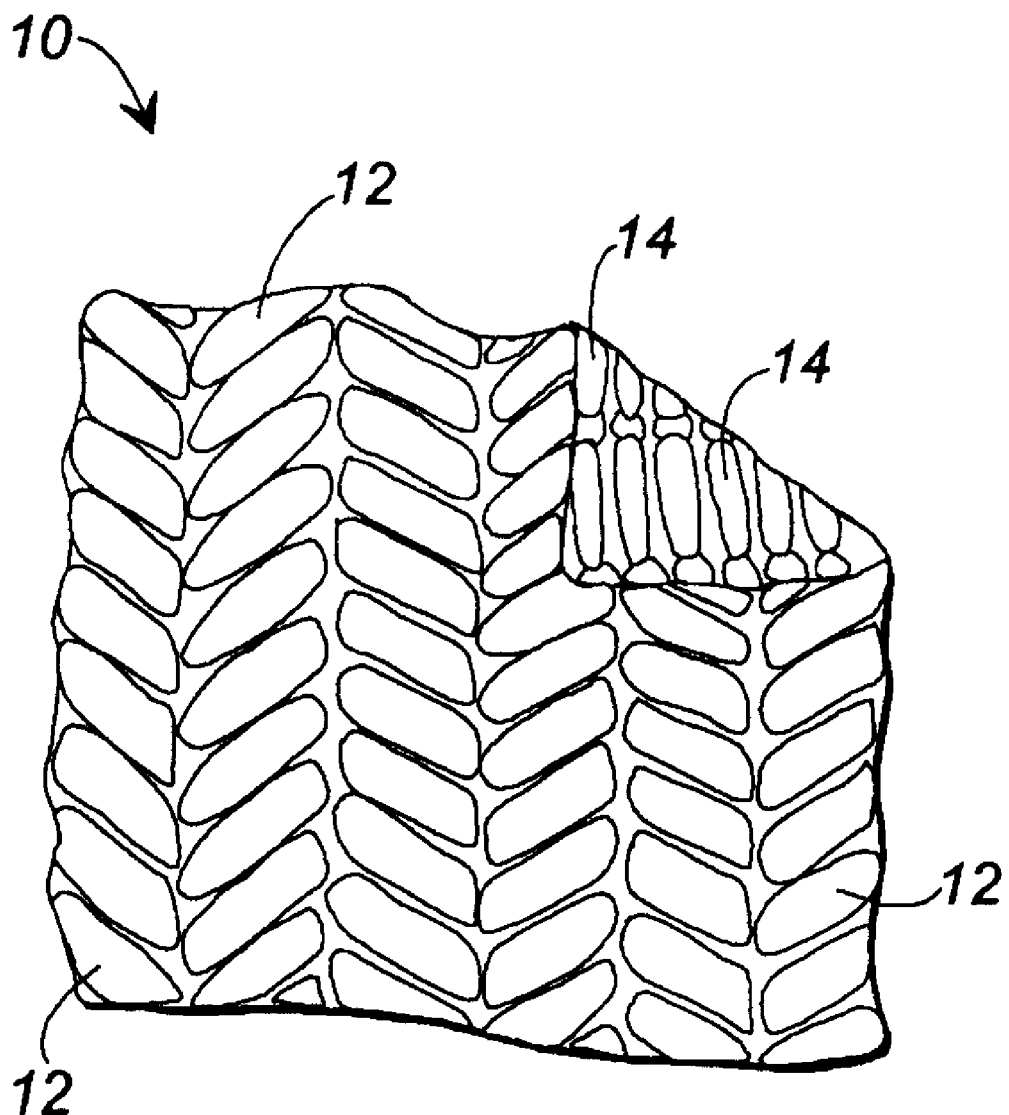
FIG. 1 is a front view of a portion of the outer surface of the knitted stretchable protective garment material of the present invention with one corner folded over to reveal the inner surface of the material.

Referring now in more detail to the drawings, in which like numerals indicate like parts throughout the several views, FIG. 1 depicts a portion of the stretchable protective garment material 10 of the present invention. The protective material 10 comprises a plurality of cut resistant strands 12 and a plurality of elastic strands 14 that are knitted together to form a plated knit in which the cut resistant strands form the outer surface and the elastic strands form the inner surface of the material. Each of the cut resistant strands 12 comprises a plurality of high strength cut resistant fibers. Similarly, each of the elastic strands 14 comprises a plurality of elastic fibers. Although a plated knit is preferred, it is to be understood that any knitted arrangement can be used. Furthermore, the material could alternatively be woven instead of knitted.

Irrespective of the particular arrangement of the strands within the material, the high strength cut resistant fibers are formed of a material which is both flexible yet tough such that the material can withstand moderate blows and slashes with sharp objects. The elastic fibers are constructed of a material which is substantially elastomeric such that garments formed of the protective garment material will be stretchable and substantially formfitting. To achieve the level of cut protection desired, the garment material is typically composed of approximately between 65% and 80% by composition of high strength cut resistant fibers, with 75% being preferred. To achieve the desired amount of elasticity, the garment material is typically composed of approximately between 3% and 35% by composition of spandex fibers. Although it is believed that higher percentages would yield effective results, experimentation has shown that a composition of approximately 5% spandex fibers results in an adequate amount of elasticity.

The high strength cut resistant fibers are preferably composed of aramid polymer, high performance polyethylene, or steel. However, due to the high cost of high performance polyethylene and the inherent stiffness of steel and steel core fibers, the cut resistant fibers most preferably are aramid fibers such as para-aramid fibers. As is known in the art, para-aramid fibers are synthetic fibers which exhibit ultra high strength, high modulus, and high toughness. Effective for use in the present invention are core spun para-aramid staple yarns manufactured by the DuPont Corporation under the trademark KEVLAR®. One or more such KEVLAR® staple yarns can be used together in forming the cut resistant strands 12 that are used to form the knitted or woven garment material. Typically, two yarns of approximately 20 denier are used to form these strands.

The elastic fibers preferably comprise spandex fibers such as LYCRA® fibers, although it is to be noted that any elastomeric fiber material which could be used to construct a formfitting garment could be used. Presently preferred for the construction of the elastic strands are multifilament spandex blend yarns comprising both spandex fibers and nylon fibers. In one aspect of the invention, a 84/16 blend of nylon and spandex fibers is used. Typically, each elastic strand 14 is composed of one multifilament spandex blend yarn of approximately 664 denier, although it will be appreciated that more than one yarn may be used if desired.

Figure 3:
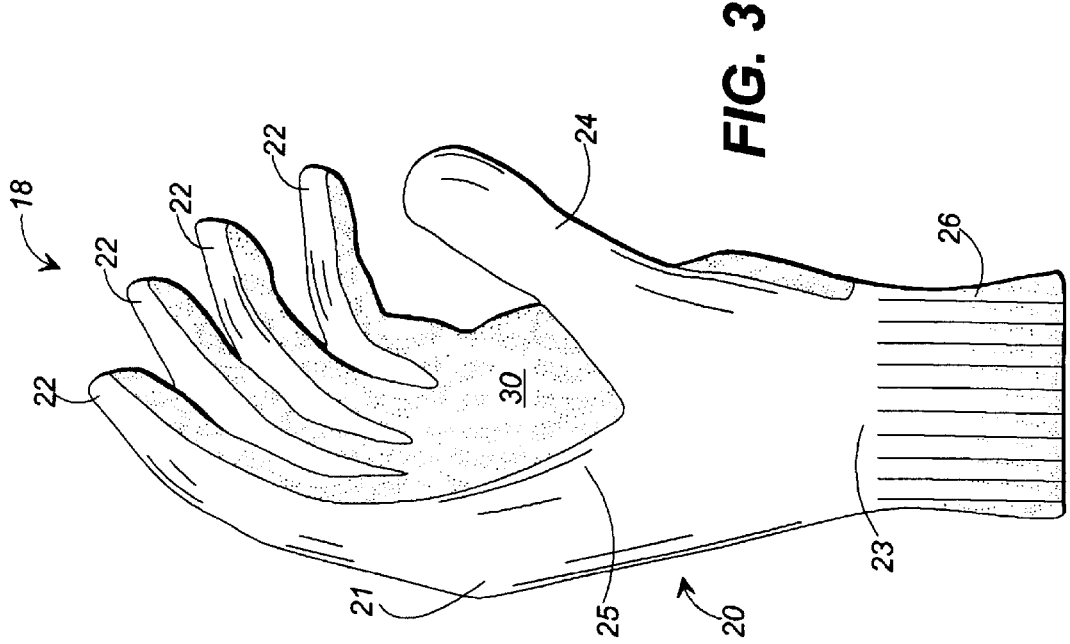
FIG. 3 is a side view of the protective glove of FIG. 2 shown in place on a human hand.
Figure 2:
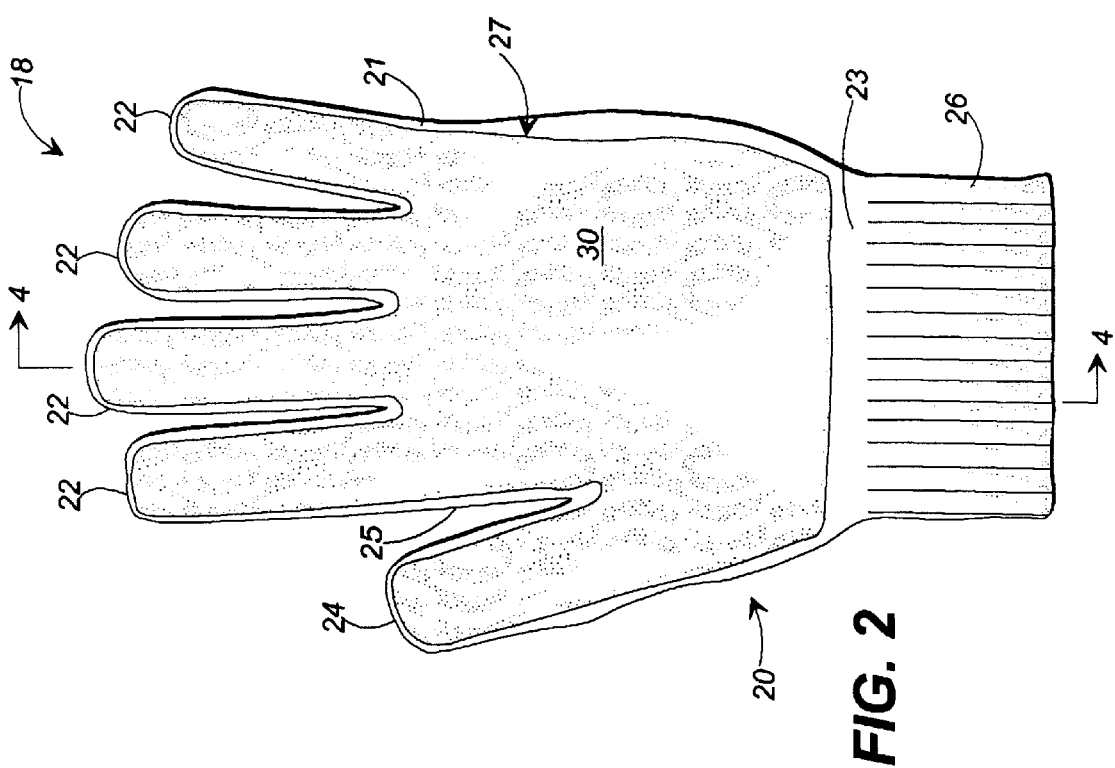
FIG. 2 is a front view of a protective glove made of the stretchable protective garment material of the present invention.
Figure 4:
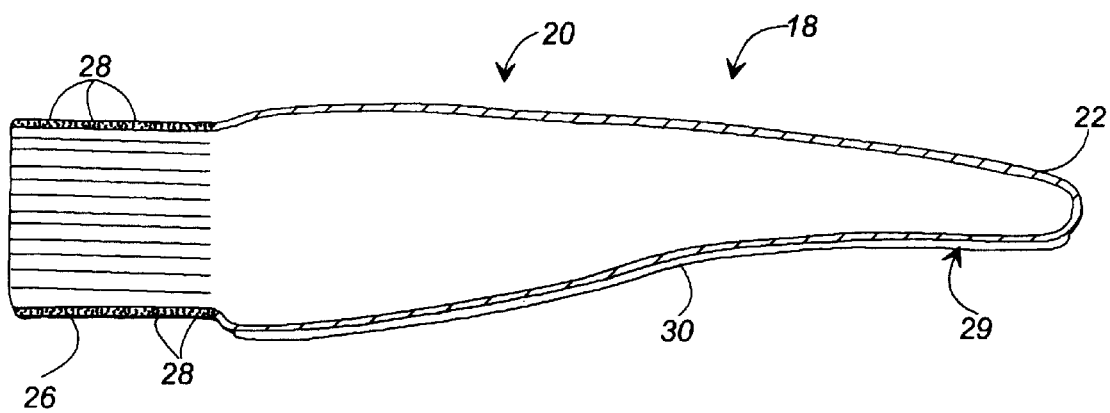
FIG. 4 is a cross-sectional view of the protective glove shown in FIG. 2 taken along line 4—4.

Turning to a specific garment which can be constructed from the above described garment material, FIGS. 2–4 illustrate a stretchable protective glove 18 of the present invention. Although the protective glove 18 will be described in detail, it will be understood that various other protective garments can be made with the protective garment material of the present invention, including vests, shirts, pants, sleeves, leggings, aprons, liners, and the like. Furthermore, other articles beyond garments could be formed such as tarps, blankets, etc.

As shown in FIGS. 2–4, the glove 18 generally approximates the contours of a human hand and comprises a glove body 20 having a top portion 21, a base portion 23, a side portion 25, and a palm surface 27. A plurality of finger stalls 22 extend outwardly from the top portion 21 of the glove body, and a thumb stall 24 extends outwardly from the side portion 25 of the glove body. Each finger stall 22 and the thumb stall 24 has a palm-side surface 29. Preferably, the entire glove 18 is integrally knitted such that the glove body, thumb stall and finger stalls are all integrally formed with one another in a seamless construction. Although the glove can be woven instead of knitted, knitting is preferred since knitted garments conform more easily to the contours of the human body than woven garments. Moreover, the seamless construction of knitted garments avoids any irritation that could be caused to the wearer from seams.

Integrally formed with the glove body 20 is an elastic wrist cuff 26. Depending upon the percentage of elastic fibers used in the glove, this elastic wrist cuff may or may not include additional elastic bands. Typically, however, the cuff includes a plurality of elastic bands 28, constructed of latex and polyester, which are integrated into the cuff (FIG. 4) to ensure a snug fit about the wrist of the wearer. Alternatively, a premanufactured elastic strap (not shown) could be sewn within the cuff to provide for this fit.

As depicted in FIGS. 2–4, the palm surface of the glove body 20 and palm-side surfaces 29 of the finger and thumb stalls 22 and 24 are provided with a palm coating 30. This coating 30 preferably is composed of an elastomeric material which is bonded to the glove 18. Possible elastomeric materials include plastisols, silicone, and synthetic rubber. Particularly effective, however, is a formulation of polyvinyl chloride (PVC) plastisol. Generally speaking, PVC plastisols are dispersions of very fine PVC particles in liquid media. Included in these liquid media are plasticizers which plasticize the PVC particles during the curing process.

Although currently available in both industrial PVC plastisol and textile printing PVC plastisol, experimentation has shown that usage of high grade textile printing plastisol results in a palm coating of greater elasticity. This difference in elasticity is most likely due to the fact that textile printing plastisols contain a larger amount of resins and plasticizers than do industrial plastisols and moreover contain less solvent than industrial plastisols. Since a high degree of elasticity is required to achieve a formfitting glove, it is high grade textile printing PVC plastisol which is preferred for production of the protective gloves. Currently, one such formulation of printing PVC plastisol is available from Rutland Plastic Technologies, Inc. Once applied and bonded to the glove through a process explained in detail below, the PVC plastisol forms a coating having a thickness of approximately between 0.5 and 1.5 millimeters.

So described, the glove 18 of the present invention provides protection to the hands of the wearer against cuts, punctures, and abrasions. This protection is attributable in one respect due to the high percentage of cut resistant strands 12 contained in the protective garment material. In a second respect, the palm coating 30 provides additional protection from such injuries. This coating provides added protection in a number of ways. First, the coating increases the thickness of the palm surface of the glove and protects the underlying substrate material. Second, the coating provides for a strong non-slip grip with which the wearer can securely grasp a blade of an assailant, thereby preventing the assailant from completing the slashing action with the blade. Third, this coating provides a smooth surface along which sharp edges, such as knife edges and needle tips, may glide. This gliding action may allow the knife blade or needle tip to be quickly moved across the glove surface, reducing the likelihood of the edge cutting the material of the glove. In addition to increasing protection against cuts and punctures, the elastic coating 30 further provides for a high degree of tactile sensitivity and also improves overall glove durability.

As noted above, the protective gloves 18 of the present invention are highly stretchable due to the elastic strands 14 contained therein. This stretchability results in a formfitting garment that can be produced in a one-size-fits-all manner. Although it is believed that the one size of glove will be sufficient to suit nearly all wearers, it will be understood that alternative sizes could be made available for persons with very large or very small hands. Being formed of an elastomeric substance, the palm coating 30 stretches with the remainder of the glove to conform to the contours of the wearer's hand. Although no absolute degree of stretch is presently contemplated, the glove and the palm coating typically can be stretched up to approximately three or four inches when the glove is pulled from the index finger stall and the cuff, without splitting or otherwise damaging the palm coating.

In manufacturing the stretchable protective garment material of the present invention, the individual high strength cut resistant yarns and elastic yarns are dyed to a desired color. Typically, each type of yarn is separately dyed since the high temperatures and pressures commonly needed to dye the KEVLAR® fibers can damage the fibers contained in the elastic yarns. Once properly dyed to the desired color, the individual yarns are plate knitted together in a conventional manner.

After the garment material has been formed, it is used to fabricate the various protective garments which are to be produced. In the case of glove manufacture, the glove body, finger stalls, and thumb stall are all integrally formed from a continuous portion of protective garment material. During fabrication, elastic bands are integrated into a lower end of the glove material to provide added resilience to the elastic cuff. This portion of the material is then turned-over on itself and sewn in place in a conventional manner to create a rolled cuff. At this point, the glove is prepared for application of the palm coating.

Figure 5:
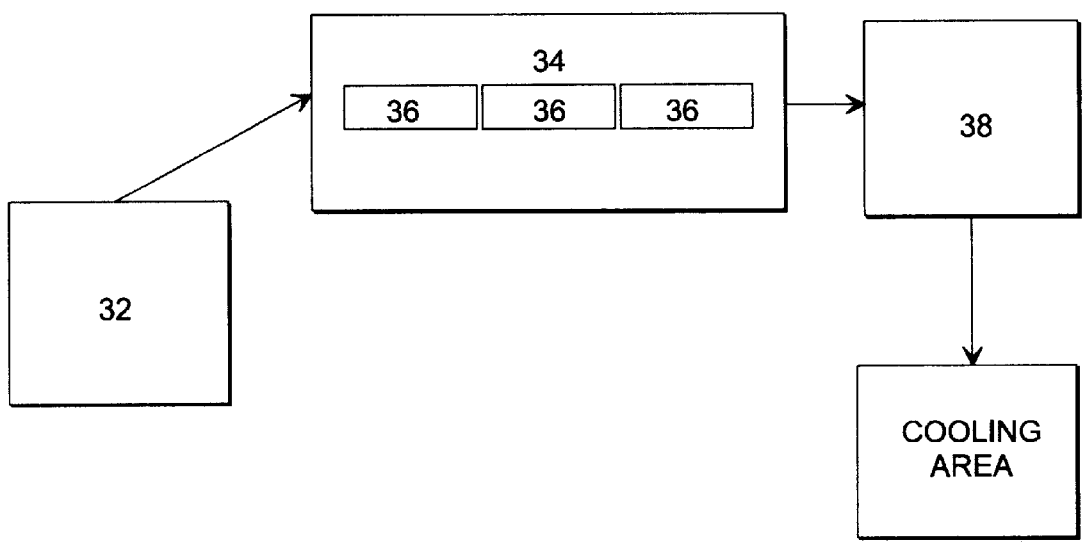
FIG. 5 is a schematic view of a method for forming an elastomeric or polymeric coating on a textile material.

The elastomeric palm coating can be applied through various coating methods. In a preferred embodiment of the invention depicted schematically in FIG. 5, the coating process is accomplished in a number of steps, each of the steps typically being executed at a separate station. First, the coating, typically a high grade textile printing PVC plastisol, is applied in liquid form to the glove. In one aspect of the invention, a screen printing machine 32 is used to apply the PVC plastisol in a specific pattern. However, it is to be noted that any other machine capable of quickly applying PVC plastisol in a specific pattern to the gloves can be used. When a screen printing machine is used, the plastisol collects atop a 20 to 40 mesh printing screen. Next, the glove is contacted with the screen and a squeegee is passed over the upper surface of the screen to force the PVC plastisol through the screen, thereby uniformly spreading the plastisol onto the palm surface of the substrate glove. Once applied to the glove, the palm coating must be cured to harden it and bond it to the glove.

The curing process is perhaps the most sensitive part of the glove manufacturing process. To properly cure the plastisol or other elastomer, the coating, and therefore the glove, must be exposed to very high temperatures. These high temperatures can have substantially detrimental effects upon the constituent fibers of the material. For example, conventional curing methods involving high temperatures and relatively long heating times can cause melting of elastic fibers such as LYCRA® and burning of KEVLAR® fibers. Accordingly, the curing process, as well as the particular chemical composition of the plastisol or other elastomer, must be carefully selected to ensure proper curing in a minimum of time to avoid damaging the substrate material of the glove.

Presently, curing is accomplished through a two-step heating process. First, the gloves are transported from the screen printing machine 32 to a mineral insulated radiant heater 34 capable of flashing the coated gloves with an intense burst of heat. Although capable of taking other forms, the radiant heater 34 typically includes several radiant emitter strips 36 arranged end-to-end. Each of these strips comprises an internal nickel-chromium heating element surrounded by magnesium oxide. The exterior sheath of the emitters is composed of stainless steel having a high emissivity coating applied thereto. An example of a suitable radiant heater is the RAYMAX 1330 radiant heater available from the Watlow company. Each of the coated gloves is exposed to temperatures approximately between 900° F. and 1200° F. within the heater 34 for a total duration of approximately 6 to 15 seconds. Typically, the actual heating time is accomplished in 1–4 second intervals under each emitter strip. For example, a glove might be heated for 3 seconds beneath a first emitter strip, indexed to a second heater strip over a duration of 1–2 seconds, and heated for another 3 seconds beneath a second emitter strip, and so forth. Although these temperatures are extremely high, the duration of the flash is short enough to avoid damaging the KEVLAR® or elastic fibers, yet long enough and hot enough to achieve partial curing of the plastisol or other elastomer.

At this time, the gloves are transferred to a standard convection oven 38 which is heated to approximately between 700° F. and 850° F. Traveling through the oven along a conveyor belt, the gloves are exposed to the heat of the oven for a duration of approximately 60 to 120 seconds. This second exposure to heat completes the curing process, and the gloves are permitted to cool in a coding area.

Fabrication conducted in accordance with the above identified method results in substantially elastic protective gloves being formed. Due to the high temperatures and the short heating times used in this method, the production time required to manufacture the gloves is greatly reduced.

In use, the gloves of the present invention can be used by law enforcement officials such as policemen, prison officers, federal marshals, customs officers, border patrol officers, and drug enforcement officers, as well as by military personnel such as soldiers and national guardsmen to prevent injury from cuts, punctures, and abrasions to the hands. Equally important, the gloves provide this protection without a concurrent loss of freedom of movement, manual dexterity, tactile sensitive, or comfort. In addition, the gloves are very durable and can be machine washed if desired.

While preferred embodiments of the invention have been disclosed in detail in the foregoing description and drawings, it will be understood by those skilled in the art that variations and modifications thereof can be made without departing from the spirit and scope of the invention as set forth in the following claims. For instance, it will be appreciated that, although described only in terms of the production of the gloves of the instant invention, the manufacturing process described herein can be used to form substantially any elastomeric or polymeric coating on a textile material.

What is claimed is:

1. A stretchable protective glove comprising:
   a glove body composed of a stretchable protective garment material that comprises a plurality of cut resistant strands and elastic strands which are intermeshed together, said cut resistant strands comprising a plurality of high strength cut resistant fibers and said elastic strands comprising a plurality of elastic fibers, said glove body having a top portion, a base portion, a side portion, and a palm surface;
   an elastic wrist cuff formed from said stretchable protective garment material and being integrally formed with the base portion of said glove body; and
   a relatively thin coating of elastomeric material bonded to the palm surface of said glove body;
   said stretchable protective glove providing protection to the hands of the wearer against cuts, punctures, and abrasions, and further being form fitting so that said protective glove substantially conforms to the contours of the hands of the wearer such that interference with the manual dexterity and tactile sensitivity of the hands of the wearer is minimized.

2. The stretchable protective glove of claim 1, further comprising a plurality of finger stalls and a thumb stall composed of said stretchable protective garment material and being integrally formed with and extending outwardly from the top portion and the side portion of said glove body respectively, each stall having a palm-side.

3. The stretchable protective glove of claim 2, wherein said palm coating extends from the base portion of said glove body, across the palm surface to the top portion of said glove body, and along the palm-side of each finger and thumb stall of said glove.

4. The stretchable protective glove of claim 1, wherein said cut resistant strands and said elastic strands are knitted together to form a knit of stretchable protective garment material.

5. The stretchable protective glove of claim 1, wherein said high strength cut resistant fibers are para-aramid fibers.

6. The stretchable protective glove of claim 5, wherein approximately between 65% and 80% of said stretchable protective garment material is composed of para-aramid fibers.

7. The stretchable protective glove of claim 1, wherein said elastic fibers are spandex fibers.

8. The stretchable protective glove of claim 7, wherein approximately between 3% and 35% of said stretchable protective garment material is composed of spandex fibers.

9. The stretchable protective glove of claim 1, wherein said elastomeric material is a polyvinyl chloride plastisol.

10. The stretchable protective glove of claim 9, wherein said polyvinyl chloride plastisol is a textile printing polyvinyl chloride plastisol.

11. The stretchable protective glove of claim 1, wherein said coating of elastomeric material is approximately 0.5 to 1.5 millimeters thick.

12. A stretchable protective glove comprising:
    a glove body composed of a stretchable protective garment material formed of a knit of cut resistant strands and elastic strands, said cut resistant strands comprising a plurality of para-aramid fibers and said elastic strands comprising a plurality of elastic fibers, wherein said garment material is composed of approximately between 65% and 80% by composition of para-aramid fibers and approximately between 3% and 35% by composition of elastic fibers, said glove body having a top portion, a base portion, a side portion, and a palm surface;
    a plurality of finger stalls composed of said stretchable protective garment material and being integrally formed with and extending outwardly from the top portion of said glove body;
    an elastic wrist cuff composed of said knitted stretchable protective garment material and being integrally formed with the base portion of said glove body;
    a coating of polyvinyl chloride plastisol bonded to the palm surface of said glove body;
    said stretchable protective glove providing protection to the hands of the wearer against cuts, punctures, and abrasions, and further being formfitting so that said protective glove substantially conforms to the contours of the hands of the wearer such that interference with the manual dexterity and tactile sensitivity of the hands of the wearer is minimized.

13. The stretchable protective glove of claim 12, wherein said palm coating extends from the base portion of said glove body, across said palm surface to the top portion of said glove body, and along the palm-side of each finger and thumb stall of said glove.

14. The stretchable protective glove of claim 12, wherein said polyvinyl chloride plastisol is a textile printing polyvinyl chloride plastisol.

15. The stretchable protective glove of claim 12, wherein said elastic fibers are spandex fibers.

16. A method for producing a stretchable protective glove, said method comprising the steps of:

forming a stretchable protective garment material that comprises a plurality of high strength cut resistant fibers and a plurality of elastic fibers;

cutting and sewing the garment material to form a glove;

applying an elastomeric coating to a palm surface of the glove;

curing the elastomeric coating in place on the glove in a two step process that comprises first passing the coated glove through a radiant heater in which the elastomeric coating and the glove are exposed to a flash of heat approximately between 900° F. and 1200° F. for a total duration of approximately between 6 to 15 seconds, and second transferring the coated glove to a convection heater in which the elastomeric coating and the glove are exposed to temperatures of approximately between 600° F. and 700° F. for a duration of approximately between 60 seconds to 120 seconds.

17. The method of claim 16, wherein the step of applying an elastomeric coating to a palm surface of the glove is accomplished with a screen printing machine.

18. The method of claim 16, wherein the step of exposing the coated glove to heat in the radiant heater includes sequentially exposing the coded glove to heat radiated from a plurality of emitter strips contained within the radiant heater for periods approximately between 1 second to 4 seconds.

19. The method of claim 16, wherein the high strength cut resistant fibers are para-aramid fibers.

20. The method of claim 16, wherein the elastic fibers are spandex fibers.

21. The method of claim 16, wherein the elastomeric coating is a polyvinyl chloride plastisol.

22. The method of claim 21, wherein the polyvinyl chloride plastisol is a textile printing polyvinyl chloride plastisol.

23. A stretchable protective glove made according to the process of claim 16.

* * * * *